United States Patent [19]

Zanutti

[11] 4,232,391
[45] Nov. 4, 1980

[54] VESSEL LOCATION SYSTEM

[76] Inventor: Hugo A. Zanutti, Clemson 271-B University Gardens, Rio Piedras, P.R. 00927

[21] Appl. No.: 870,610

[22] Filed: Jan. 19, 1978

[51] Int. Cl.³ .................... H04B 1/034; G08B 1/08
[52] U.S. Cl. .................................. 455/96; 455/97; 340/539; 340/840.04; 346/8; 346/59; 9/9; 9/33
[58] Field of Search .................... 325/112–116; 9/9, 33; 340/517, 539, 521, 177 R, 524, 177 CA, 189 R, 201 R; 346/8, 59, 60

[56] References Cited

U.S. PATENT DOCUMENTS

| | | | |
|---|---|---|---|
| 2,792,274 | 5/1957 | Ruddock | 346/8 |
| 2,928,935 | 3/1960 | Murray | 325/116 |
| 3,253,810 | 5/1966 | Penn | 325/116 |
| 3,341,871 | 9/1967 | Oliveau | 325/115 |
| 3,371,349 | 2/1968 | Schinner et al. | 346/60 |
| 3,432,755 | 3/1969 | Moreno | 325/116 |
| 3,461,429 | 8/1969 | Gray | 346/8 |
| 3,906,370 | 9/1975 | Apps | 325/116 |
| 3,933,109 | 1/1976 | Boisrayon et al. | 325/116 |
| 3,943,445 | 3/1976 | Dawson | 325/116 |

*Primary Examiner*—Jin F. Ng
*Attorney, Agent, or Firm*—Wolf, Greenfield & Sacks

[57] ABSTRACT

A system for determining the location of the sinking of a vessel by providing a seaworthy box that is automatically ejected from the vessel at the time of sinking and that has a battery aboard the box for powering a radio transmitter that sends distress signals that enable a rescue vessel to locate the ejected box. The system employs a water-activated release mechanism and a stationary box with which the ejected box mates. When the release mechanism operates the box is ejected and at the same time the radio transmission commences. The release mechanism can also be used to release life savers and life boats. The ejected box has a printing system for registering any faults that may have occurred prior to sinking. The vessel may be provided with fire detectors, for example, and operation of a detector is registered along with the time of detector operation to thus provide a chronological log of all important events. An important part of the system is the automatic sea compass which continuously records longitude and latitude position. This information, particularly at the time of sinking, is recorded on the printing system in the ejected box so that when the box is located there is an immediate visual indication of longitude and latitude at the time of sinking.

13 Claims, 17 Drawing Figures

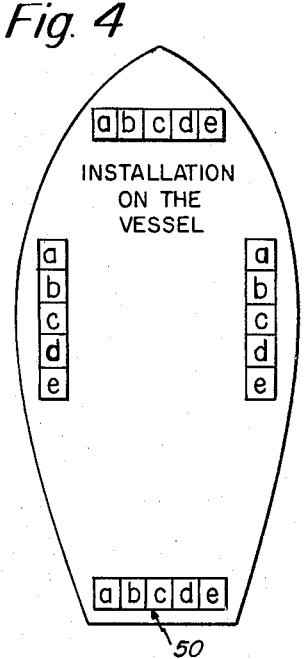
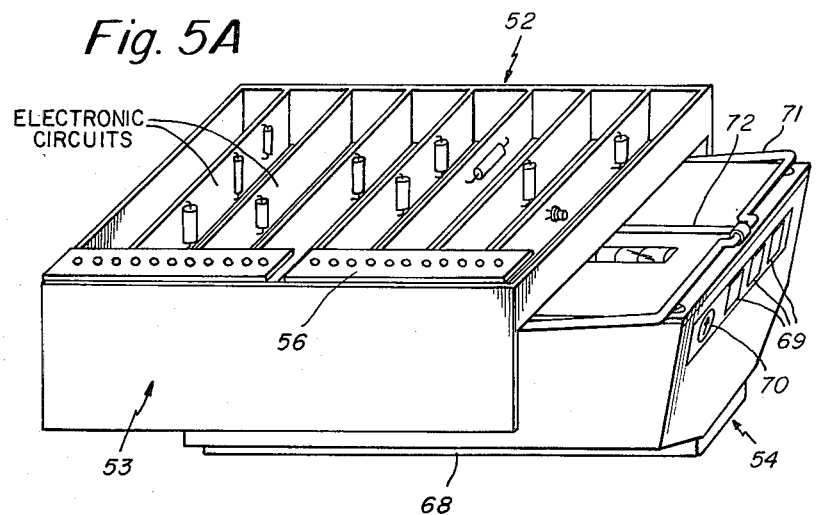
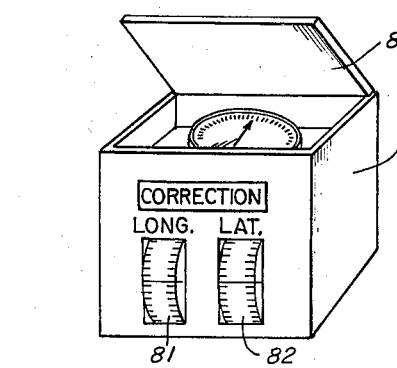
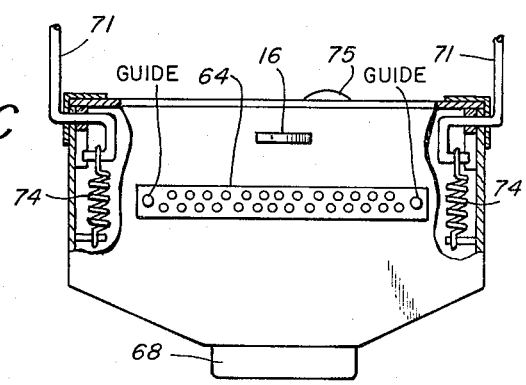

VESSEL LOCATION SYSTEM

BACKGROUND OF THE INVENTION

The present invention relates in general to a system for locating a vessel that has sunk. This invention is useful in the salvaging of vessels that have sunk and is particularly adapted to bringing quick assistance to the survivors from a sunken vessel. It is understood that the principles of this invention, although explained in the context of a vessel, may also be applied, for example, to airplanes.

There are a great many disasters that occur at sea with the loss of many lives when a vessel sinks, sometimes quite unexpectedly with the captain of the vessel being unable to send any signals to indicate his exact position at the time of the sinking.

Accordingly, one object of the present invention is to provide a system for locating the position of a vessel at the time that the vessel sunk.

Another object of the present invention is to provide a vessel location system that ejects a box or the like at the time of sinking which can be later retrieved. The box has registered therein, preferably the type of accident that caused the shipwreck. In this box is registered any faults that may have occurred, either at the time of shipwreck or therebefore.

Still another object of the present invention is to provide a vessel location system as set forth in the preceding object wherein the box that is ejected has aboard, a radio transmitting means that is capable of emitting signals to permit retrieval of the box by a rescue party. In the box there is registered the longitude and latitude of the vessel at the time of the shipwreck and also the day, hour and minute at the time of the shipwreck.

Another object of the present invention is to provide a vessel location system incorporating the ejectable box and which further has illumination means to make it easier for identification by rescuers especially in the nighttime.

Still a further object of the present invention is to provide a release mechanism that is water-activated so as to automatically eject the radio transmitter box at the time of shipwreck. The release mechanism may also be used in accordance with the invention for automatically ejecting from the vessel other rescue equipment such as life savers or life boats.

Another object of the present invention is to provide an automatic sea compass that automatically and continuously registers the longitude and latitude of the vessel at all times. The ejectable box is preferably provided with a printing system so that the longitude and latitude readings can be registered especially at the time of shipwreck.

SUMMARY OF THE INVENTION

To accomplish the foregoing and other objects of this invention, there is provided a vessel location system which comprises a stationary box located on the vessel and an ejectable box received by the stationary box. The ejectable box preferably mates inside of the stationary box and is held under bias within the stationary box until it is to be ejected. The ejectable box is constructed so that it is seaworthy. There is provided aboard the vessel a water-activated means that is operated during the sinking of the ship for the purpose of ejecting the box from the vessel. The box that has been ejected in turn has therein a means for transmitting a distress signal so as to permit rescuers to locate the ejected box. When the box is ejected from the sinking vessel, there is provided an antenna means on the box and also a means for positioning the antenna means to permit the transmission of the distress signal. This transmission starts as soon as a box is ejected from the vessel. Also, the box contains battery means and switch means. The switch means is operated when the box is ejected from the stationary box and couples battery power to the transmitting means which is preferably a radio transmitter.

One of the important features of the present invention is the release apparatus for releasing an object from the vessel. The object that is released or ejected may be the radio transmitting box discussed hereinbefore or may be other life saving objects such as a life saver or life boat. This release apparatus comprises interlock means, one associated with the object and the other associated with the vessel. Means are provided for retaining the said one interlock means in a biased position. Electromechanical means are used for releasing the other interlock means to enable ejection of the object. The electromechanical means is operated from a water-activated switch means which includes an electronic circuit for operating the electromechanical means when the vessel is sinking. The interlocked means, preferably includes a retaining hook as one part thereof, and some type of a retaining plate or bar as the other part thereof. The water-activated switch means includes a switch disposed at one end of a housing. The housing has openings at the bottom defining a water gate to permit water to enter the housing and also has breather holes at the top to permit escape of the air from the housing. When the housing is totally filled with water, then the switch at the top end thereof is activated by closing a circuit to operate the electromechanical means.

Another important feature of the present invention is the sea compass apparatus, which generally comprises a longitude indicator means, a latitude indicator means, and means for driving each of the indicator means in one direction or the other. The control means for driving the indicators is responsive to both the speed of the vessel and the direction of travel of the vessel. Each of the indicator means preferably comprises a rotatable cylinder having indicia thereon indicative of the longitude and latitude positions. These cylinders are initially set manually at a position corresponding to the longitude and latitude of the vessel at the time that the setting is made. Thereafter, the control of this invention takes over and changes the longitude and latitude either in an up or down direction numerically so as to always maintain the exact longitude and latitude of the vessel. These longitude and latitude or signals may be periodically stored by means of the printing system in the ejected box, so that there is a periodical recordal of the position of the vessel. Also, the recording of longitude and latitude of the time of ejection of the box will appear through a visual window in the box so that when the box is retreived there will be an immediate indication of longitude and latitude at the last position of sinking of the vessel.

In the sea compass apparatus, the means for driving the indicators includes north and south motor means for mutually exclusively driving the longitude indicator means and east and west motor means for mutually exclusively driving the latitude indicator means. The sea compass comprises a conventional compass having a magnetic needle but further including magnetic coil detection means for registering in a decimal notation the position of the magnetic needle at all times. For example, the needle may be pointing in the northeast quadrant at a particular position therein in which case both the north and east motors are enabled, but are driven at different speeds depending upon the position within that quadrant. If the direction of travel is more to the north than to the east, then the north motor is driven at a more rapid speed than the east motor. The specific circuitry disclosed herein for providing this control includes oscillators coupling to a mixer circuit for providing a frequency corresponding to the decimal notation. The output of the mixer couples to a comparator circuit, which couples predetermined voltages from a resistor string to the north and east motors for operation thereof. In other quadrants, of course, different ones of the motors will be operated. For example, in the southeast quadrant, the south and east motors are operated, and the other two motors are maintained inoperative.

DESCRIPTION OF THE DRAWINGS

Numerous other objects, features and advantages of the invention should now become apparent upon a reading of the following detailed description taken in conjunction with the accompanying drawings, in which:

FIG. 4 is a schematic diagram showing the vessel with the alarm installation thereon;

FIGS. 5A, 5B, and 5C show views of the stationary box and the box that is to be ejected from the vessel;

FIG. 6 is a perspective view showing the automatic sea compass of this invention;

DETAILED DESCRIPTION

Figure 1:
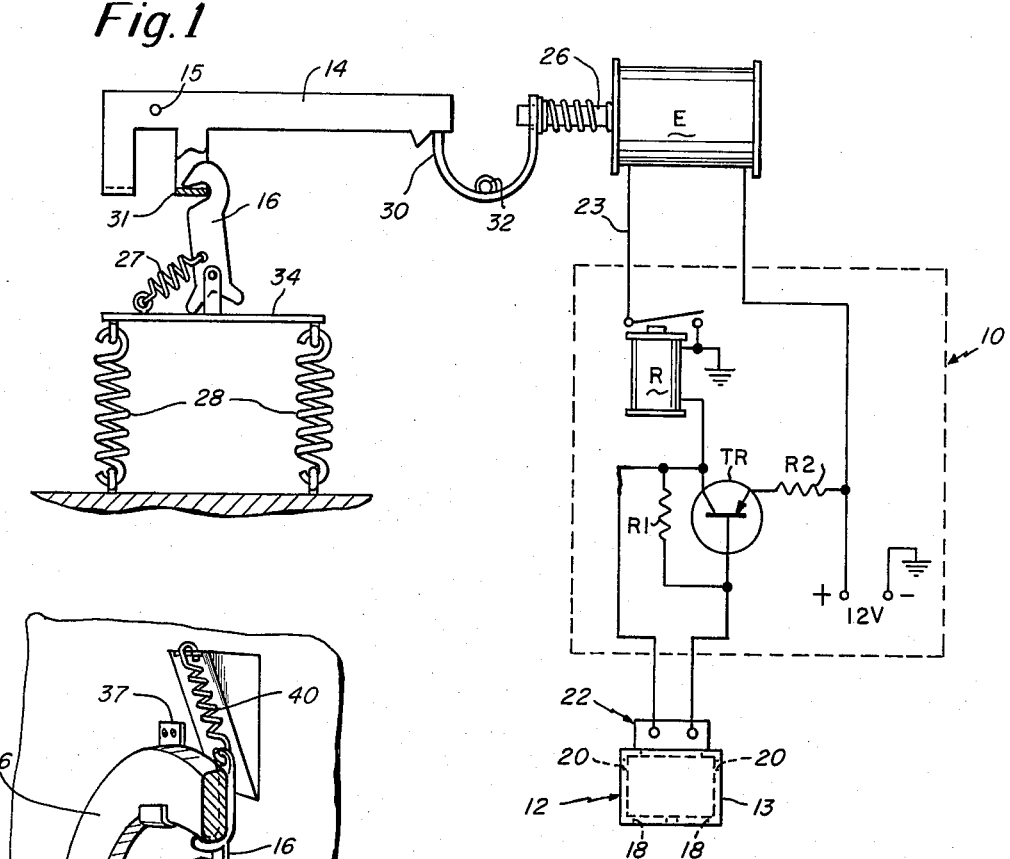
FIG. 1 is a schematic diagram showing the general construction of the water activated release apparatus.
Figure 2:
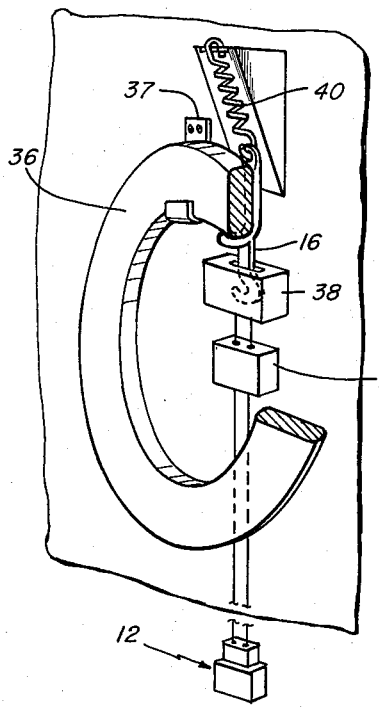
FIG. 2 shows a release apparatus of the general type shown in FIG. 1, used with a life saver that is ejected from the vessel.
Figure 3:
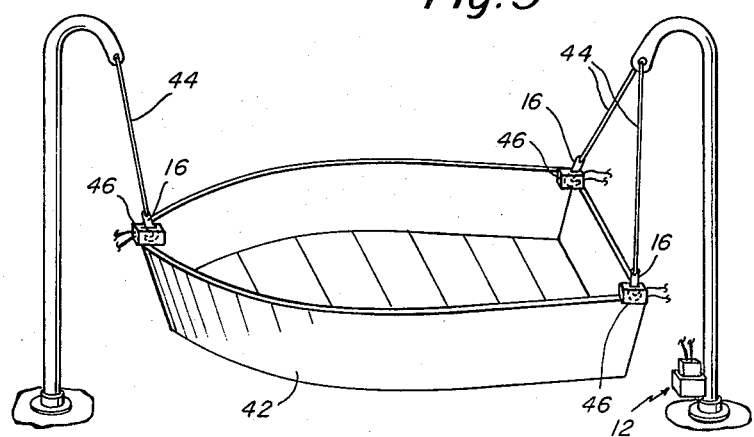
FIG. 3 shows a plurality of these release members used in association with a lifeboat that is to be ejected from the vessel at the time of sinking.

FIGS. 1-3 show one important part of the system of this invention concerned with a release mechanism that may have many used including the uses illustrated in FIGS. 2 and 3 and other uses described hereinafter. The release apparatus is shown in some detail in FIG. 1 and further illustrations used are depicted in FIGS. 2 and 3.

The release apparatus comprises an electronic circuit 10, an activating member 12, and electromagnet E, a release bar 14, and a retaining hook 16. The activating member 12 comprises a housing 13 having disposed therein lower passages 18 which form water gates permitting entry of water into the housing 13. At the top of the housing there are disposed one or more breathing holes 20 permitting air to escape as the water enters through the bottom passages 18. At the top of the housing 13, there is disposed a switch 22 having a pair of contacts that may be exposed to the entering water so as to provide a low impedance path across the contacts in response to water contact at the switch 22.

The pair of terminals from switch 22 couple to the electronic circuit 10 with one of the terminals coupling to the collector or transistor TR while the other terminal couples to the base of transistor TR. When there is a low impedance path across the terminals of the switch 22, the transistor TR becomes more conductive and a latching current flows by way of resistor R2 and transistor TR to the relay R. When this occurs a ground signal is maintained on line 23 coupling to the electromagnet E causing the electromagnet to operate and pull in its plunger 26.

The release bar 14 pivots about pivot rod 15 and is normally biased in a clockwise direction by means of the retaining hook 16 and associated springs 27 and 28.

The release bar 14 is held in the position shown in FIG. 1 under a biasing force by means of the support 30 which is rotatable about the pivot 32. When the plunger 26 of the electromagnet E is attracted inwardly the support 30 rotates counterclockwise about its pivot 32 releasing the release bar 14 and permitting it to move clockwise thereby disengaging the bar 31 from the hook 16 and permitting the plate 34 to move downwardly under the action of the springs 28.

The embodiment of FIG. 1 is illustrative in the sense that the construction does not show anything being propelled in response to the circuit actuation. However, it is understood that when the retaining hook 16 is released, this may expel an object from the vessel. For example, FIG. 2 shows a life saver 36 normally supported from a bracket 37. FIG. 2 also shows the activating member 12, electronic circuit 10 and other parts of the release mechanism including the release bar and electromagnet. The remainder of the apparatus is shown in block fashion in box 38. The retaining hook 16 is shown about the life saver 36. It can be seen in FIG. 2 that when water activates the activating member 12 the hook 16 will be released from the box 38 and the life saver 36 will be propelled off of its support bracket 37 under the biasing force of the spring 40.

FIG. 3 shows a further illustration of the use of the release mechanism of this invention. In FIG. 3 there is shown a small boat or dory 42 supported by three lines 44 each having at their end a retaining hook 16. A box 46 is provided for receiving each of the hooks and the box 46 may contain substantially the same mechanism as shown in FIG. 1. Lines will couple this mechanism to the water activating member 12 shown disposed below the boat. In the event that the vessel is sinking, the life boat 42 is released when the water actuates the member 12. Then the hooks 16 will release and the boat will then be free to accommodate passengers.

The activating member 12 is especially constructed so that rain or water from waves will not activate the device. It is noted that the water enters from the bottom and thus the whole housing 13 essentially has to completely fill with water before activation takes place. Any rain or water from waves would not fill the housing and any water that enters would tend to simply exit through the passages 18.

When the life boat 42 is released, it will glide softly over the water to avoid any damage from a rough beating that may occur if it were in its retained position. The boat can then be used to take out medicines, provisions, and anything else that is necessary. The release apparatus preferably operates with batteries to provide the necessary voltage for the electronic circuit 10 and the electomagnet E. The batteries are preferably placed in a hermetically closed box to avoid rusting of the contacts. The batteries can be placed separate from the release mechanism and they can also be used to work several different release mechanisms with the same group of batteries.

The release mechanism is convenient for any type of embarkation and is safe to use. The retaining hooks are not easily removed even under adverse sea conditions. The hooks are preferably small but are adapted according to the weight that they are to support.

In accordance with the invention there are many different conditions that are registered in association with a shipwreck. For example, a radio transmitter is used that emits a signal when it is floating in the water so that the radio transmitter may be located. This radio transmitter is located on a box that is automatically ejected from the vessel at the time of the shipwreck for the purpose of conveying important information to those trying to locate the vessel. Also, at the time that the device is ejected from the vessel there is registered the position of the device at the time of the shipwreck. In addition, there is registered the day, hour and minute of any and all faults that may occur.

In accordance with the invention an automatic sea compass is provided. Also, the ejected device preferably is provided with lights so that it can be located at night and make it easier for identification by rescuers.

The apparatus of this invention can be adapted to any other vehicles other than vessels and even airplanes. Also, this system can register many functions automatically.

Figure 7:
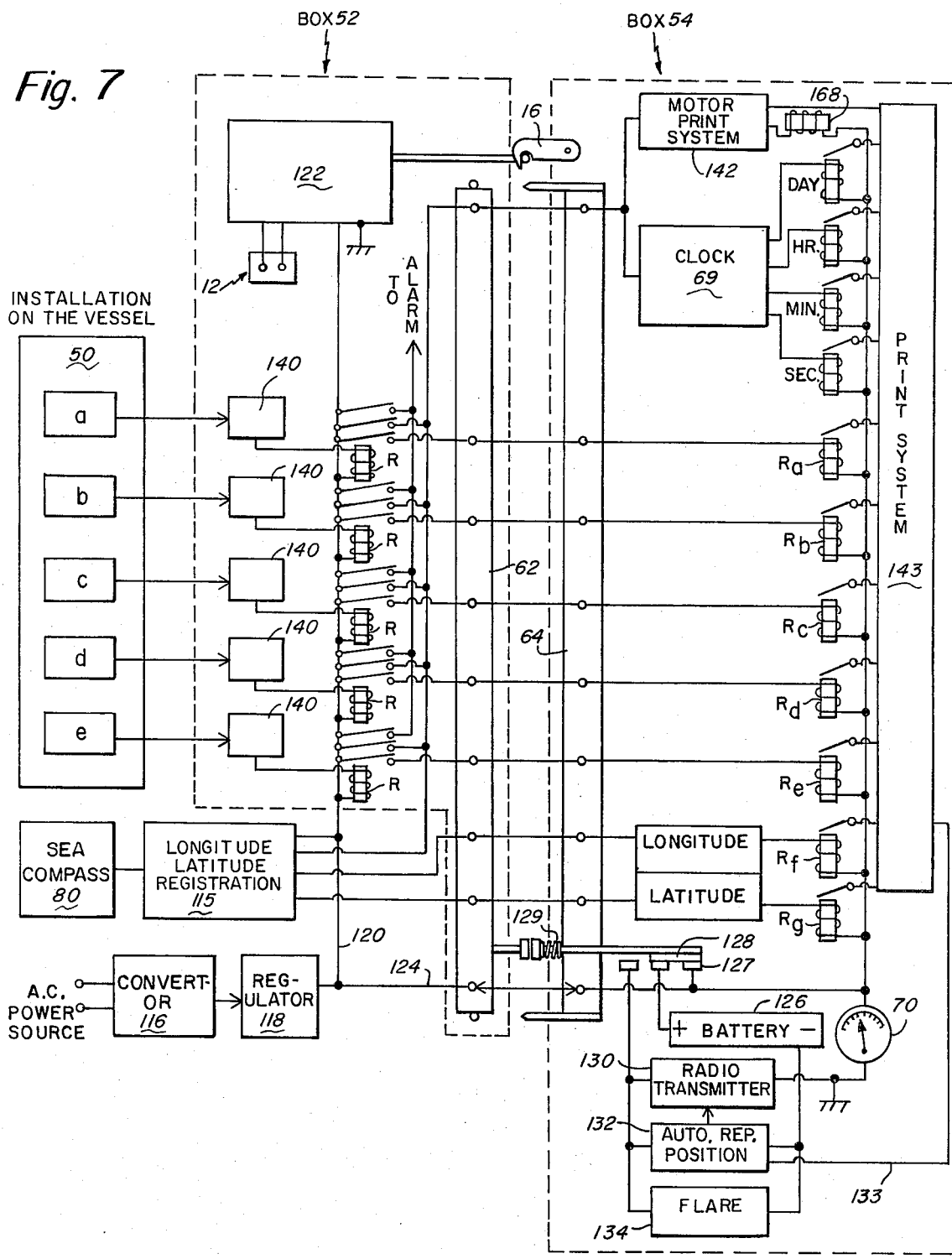
FIG. 7 is a schematic diagram associated with the system of this invention.

FIG. 4 is a somewhat schematic diagram showing a typical installation on the vessel of alarms which may be conventional alarms. In FIG. 4 it is noted that there are four locations for the alarms, although, this will depend upon the type of vessel and its size. The alarms a, b, c, d, and e may respectively refer to alarms for collision, flood, fire, explosion, and vessel break-up. These alarms may each be of conventional design such as a typical ionization detector for detecting any fire or smoke. FIG. 7 shows a typical alarm box 50 having each of the aforementioned alarms a, b, c, d, and e. These alarm signals couple to box 52 discussed in more detail hereinafter with reference to FIG. 7.

FIGS. 5a, 5b and 5c show primarily the mechanical construction for the boxes 52 and 54. The box 54 fits within the box 52 as shown in FIGS. 5a and 5b and when the vessel is sinking or about to sink the box 54 is meant to be expelled from the vessel with the box 52 being maintained in a fixed position on the vessel. The box 54 is then meant to later be rescued by a rescue party. The boxes 52 and 54 are shown in more detail as to their electrical composition in FIG. 7.

The box 52 comprises a housing 53 for supporting electronic circuitry as shown in FIG. 7 including connectors 56 shown in FIG. 5a. The box 54 is supported in the box 52 by means of rails 57 on the inner surface of the box 52 cooperating with extending flanges 58 on the sides of the box 54. Within the box 52 adjacent to the rails 57 there is disposed as viewed in FIG. 5 a water activated member 12 such as the one previously discussed with reference to FIG. 1. Box 52 may also contain subtantially all of the rest of the release apparatus of FIG. 1 including an opening 60 for receiving the retaining hook 16 shown in FIG. 5b. There is also disposed within the box 52 a connector part 62 that is adapted to mate with a like connector part 64 shown in FIG. 5c. One of these connector parts may be a male while the other is a female connector part.

In order to expel the box 54 from the vessel a biasing system is necessary and this system is included within the box 52 and comprises expulsion springs 65 only one of which is shown in FIG. 5b, and bar 66. FIG. 5b shows the springs in their tensioned position as though the box 54 were in place. When the box 54 is inserted into the box 52 the retaining hook 16 engages with a bar such as the bar 31 shown in FIG. 1 and the two boxes are locked in their relative positions such as shown in the view of FIG. 5a.

The box 54 is preferably a hermetically sealed box and its measurements are determined to some extent by the printing system that is disposed therein. This printing system is discussed in more detail hereinafter. The construction is such that it is supported on the water after it has been expelled in an upright position. The lower end as noted in FIG. 5b of box 54 has a tapered shape and is provided with a bottom housing 68 that is also hermetically closed and is for containing the batteries that produce 12 volts for feeding the circuits within both of the boxes. It is preferred that the components within the box 54 be arranged in a way to keep the weight evenly distributed so that the box 54 floats quite evenly.

The box 54 also contains a radio transmitter discussed in more detail hereinafter with reference to FIG. 7. A clock 69 is viewable through one end of the box 54. Adjacent to the clock 69 there is provided a meter 70 for determining the battery current. With reference to FIGS. 5a-5c it is noted that the box 54 also has a rescue hoop 71 having supported therefrom an antenna 72. The hoop 71 and the antenna 72 may be folded to the position shown in FIG. 5a and the hoop and antenna are released when the boxes separate from each other by means of the biasing springs 74 shown in FIG. 5c. Thus, as soon as the box 54 is expelled from the vessel the hoop opens and the antenna is moved to an upright position so that radio signals may be transmitted therefrom.

FIG. 5a shows the connectors 56 which are also represented in FIG. 7 by lines coupling from the box 50 to the box 52.

FIG. 5b also shows the magnifying glass 75 for viewing printing within the box. The printing system is discussed in detail hereinafter.

FIG. 6 shows the automatic sea compass of this invention which may be installed on the vessel adjacent to the box 52. Connections couple electrically from the sea compass to the connector 56 of box 52. The automatic sea compass comprises a housing 80 having front apertures for receiving cylinders 81 and 82, one for denoting longitude and the other for denoting latitude. The positions of the cylinders 81 and 82 may be adjustable from the front of the sea compass. Further details of the construction of the sea compass are found in additional drawings such as in FIG. 8. After the sea compass is installed and operated, it is necessary to make an initial adjustment so that the cylinders 81 and 82 have the correct longitude and latitute corresponding to the position of the vessel at the time the adjustment is made. The housing 80 is provided with a cover 84 prevents any rust or dust from entering the housing.

Figure 8:
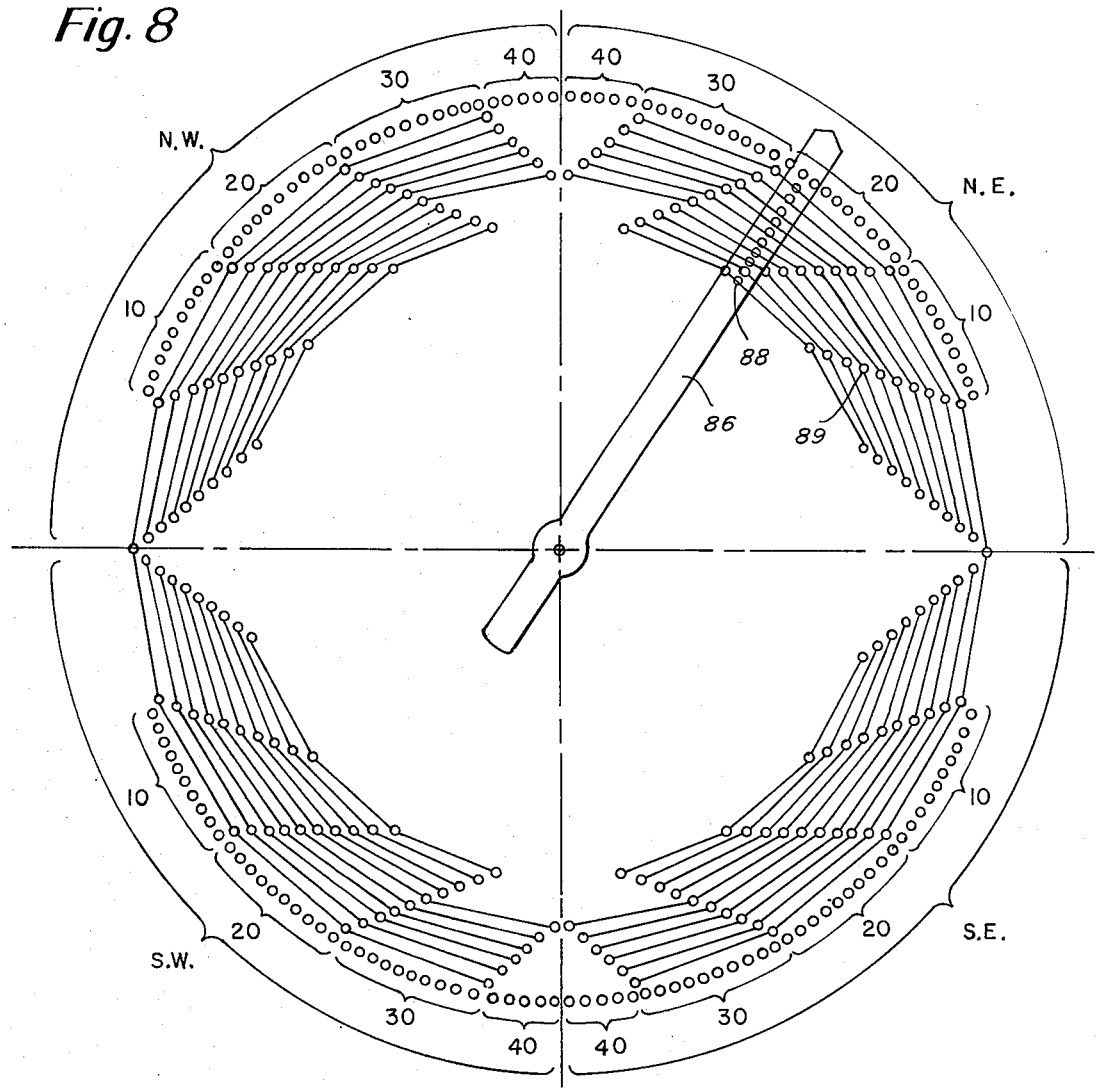
FIG. 8 shows the compass and magnetic needle and the associated magnetic detection coils in schematic form.

The compass portion of the device is shown schematically in FIG. 8. In FIG. 8 the magnetic needle 86 is shown in the northeast quadrant indicating the direction of travel of the vessel. FIG. 8 also shows each quadrant separated into 45 segments, each covering two degrees. In FIG. 8 the magnetic needle is directed at approximately a position of 29 degrees in the northeast quadrant out of a total of 45 degrees. The magnetic needle 86 has disposed therealong, in equal space relationship, a plurality of individual sensing coils 88 each of which is adapted to inductively couple with a corresponding coil 89 disposed adjacent thereto in the array depicted in FIG. 8. Actually, the outermost coils 89 are for sensing the tenths position while the successive groups of inner coils are for detecting the units. For the magnetic needle 86 depicted in FIG. 8 in that position, a coil at the very end of the needle aligns with the "20" coils and a second coil 88 disposed nearest to the center of the needle aligns with a "9" coil to provide a resultant positional indication of "29" in the northeast quadrant.

As depicted in FIG. 8, each of the unit coils are connected together in each quadrant. Also, all of the tens coils in each range of 0-10, etc. are interconnected together. The induced signals between the coils 88 and 89 couple to the circuitry shown in FIG. 11. FIG. 12 shows further detail of one portion of the circuitry such as that associated with the northeast quadrant.

Figure 9:
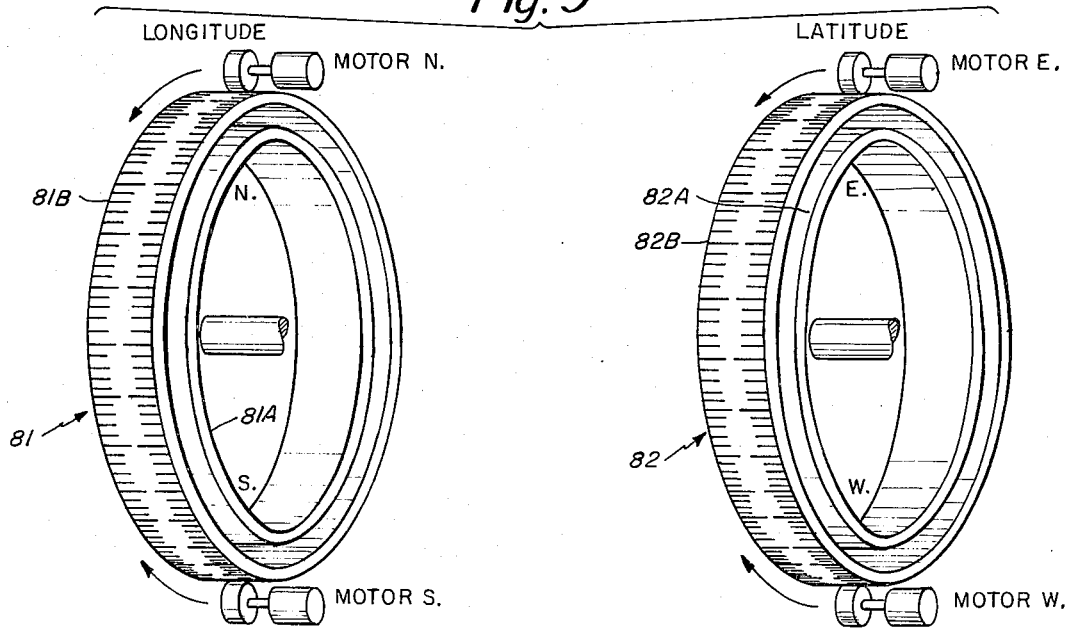
FIG. 9 shows perspective views of the longitude and latitute cylinders.

Reference is now made to FIGS. 9-12 for a better understanding of the operation of the automatic sea compass of this invention. FIG. 9 shows the longitude and latitude cylinders 81 and 82, respectively, also depicted in FIG. 6. The longitude cylinder comprises an inner fixed cylinder 81A and an outer rotatable cylinder 81B. Similarly, the cylinder 82 comprises an inner fixed cylinder 82A and an outer rotatable cylinder 82B. FIG. 9 also shows the four motors N, S, E and W which correspond to the four directions north, south, east and west, respectively. These motors are also shown schematically in FIG. 11. In FIG. 9 each of the motors engages with the rotatable cylinder so as to drive the cylinder in one direction or the other, depending upon which of the motors is excited. The circuitry operates so that motors N and S operate mutually exclusively as do motors E and W.

The longitude and latitude readings change depending upon basically two factors. Firstly, the longitude and latitude depends upon the speed of movement of the vessel and secondly, upon the direction of travel of the vessel. For example, if the vessel is travelling in a direct north course the latitude does not essentially change whereas the longitude will change as a function of the vessel speed. If the direction of travel is in the northeast quadrant, for example, then the motors N and E are activated and the speed of rotation is a function of the particular position in the northeast quadrant and also the speed of the vessel.

Figure 11:
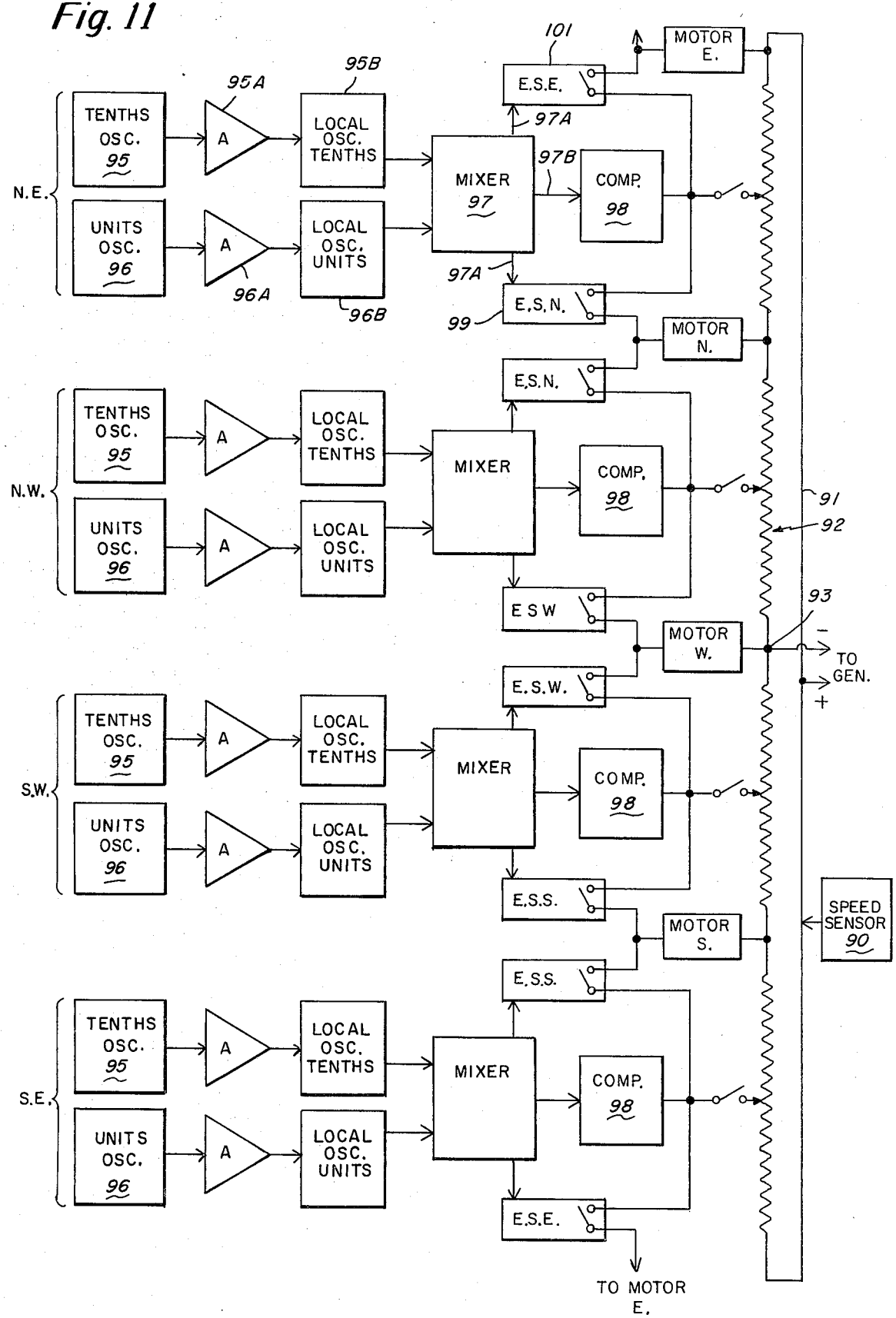
FIG. 11 is a schematic block diagram of the control for the automatic sea compass.
Figure 12:
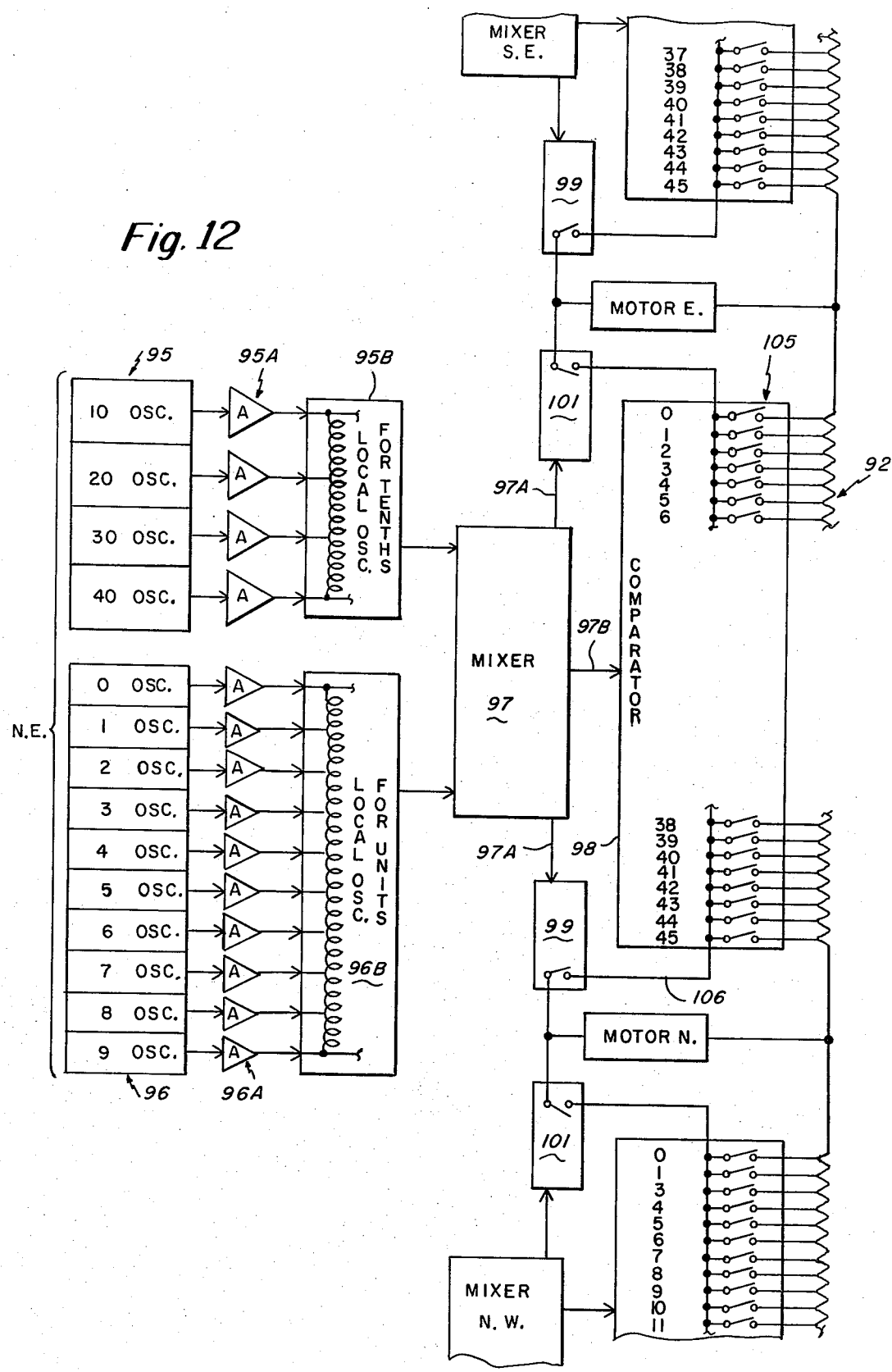
FIG. 12 shows a further detail of a portion of the circuitry shown in FIG. 11.

FIG. 11 shows the control for the motors E, N, W and S. There is substantially identical circuitry associated with each of the quadrants and thus in FIG. 12 only one of the quadrants, namely the northeast quadrant has its circuitry shown in detail. In FIG. 11, the control voltage on line 91 is from a speed sensor 90 which provides a voltage on line 91 that is a function of the speed of the vessel that is sensed by sensor 90. This sensor may couple to the vessel propellor or other means may be used for sensing the speed of the vessel. The control voltage on line 91 feeds a resistor string 92 having multiple taps therealong preferably grounded at point 93.

Each quadrant such as the northeast quadrant has associated therewith the tenths oscillator 95 and a units oscillator 96, the outputs of which couple to amplifiers 95A and 96A and in turn to local oscillators 95B and 96B, respectively. The two signals shown coupling from the local oscillators are directed to a mixer 97 which has two enabling outputs 97A and another output 97B which couples to the comparator circuit 98. In FIG. 11 the lines interconnecting at the various blocks are shown as single lines. However, it is understood that the connections are more specifically as depicted in FIG. 12.

FIGS. 11 and 12 also show associated with each quadrant, electronic switches 99 and 101 which couple control signals to the motors N and E, respectively.

As previously mentioned, and with reference to FIG. 8 the position of the magnetic needle 86 is detected by means of a magnetic coupling technique. The magnetic coils 88 may simply comprise a coil that is shorted thereacross while the coils 89 form a part of each of the oscillator circuits 95 and 96. Depending upon the particular alignment between the coils 88 and 89, and assuming that the needle is in the northeast quadrant, then the oscillators 95 and 96 are conditioned to oscillate at a frequency which is a function of the position of the magnetic needle 86. For example, in the previous example given for a position of "29" in the northeast quadrant, the oscillator 95 may oscillate at a relative frequency of 20 cycles. The units oscillator 96 operates at a relative frequency of 9 cycles. It is understood that the actual frequencies may in fact be different than as stated, but the ratio therebetween is the same. Because the needle 86 can align in only one position at a time there can only be essentially one output from each of the oscillators 95 and 96. Furthermore, when the needle is in the northeast quadrant, there are no signals from the other oscillators 95 and 96 associated with the other three quadrants. Thus, for the position depicted in FIG. 8 control is only in the circuitry associated with the northeast quadrant depicted in FIG. 12.

After amplification by way of the amplifiers 95A and 96A, the predetermined signals couple to the local oscillators 95B and 96B. The outputs from these local oscillators couple to a mixer wherein the two frequency signals are essentially added. Thus, there is provided on the output line 97B a frequency signal, the frequency of which is a function of the addition of the two input signals from the oscillators 95B and 96B. In the previously used example, this frequency would be "29" cycles. This signal couples to comparator 98 which has associated therewith a string of switches 105 which may be electronic switches, only one of which is closed depending upon the frequency of the signal on line 97B. The signal from the electronic switches is a voltage level signal from the resistor string 92 coupled by way of line 106 and the electronic switch 99 to the motor N and the motor E for control thereof.

It can be seen from FIGS. 11 and 12 that the motors operate on the principle of a voltage different thereacross. Thus, if one of the lower placed switches 105 is operated the voltage difference across the resistor string 92 which is impressed across motor N is relatively small in comparison to the larger voltage difference that will be realized across motor E. This has the effect of indicating that the latitude is changing at a larger rate than the longitude.

In the previously given example, in the northeast quadrant the "20" oscillator 95 is operated as is the "9" oscillator 96. Under these conditions the output from the mixer on the line 97B is a frequency that relates to frequency "29". Thus, the "29" comparator illustrated in FIG. 12 has its associated switch 105 closed coupling a predetermined voltage level from the resistor string 92 by way of switches 99 and 101 to motor N and E, respectively. For this example, the voltage difference across motor E is larger than the voltage difference across motor N and thus motor E operates somewhat more rapidly than motor N and indicating that the latitude is changing at a slightly faster rate than the longitude. When the mixer 97 detects essentially any frequency signal an enable signal is provided on lines 97A to operate the appropriate electronic switches 99 and 101. Only these switches associated with the northeast quadrant are operated and all other electronic switches are not operated as long as the active quadrant is the northeast quadrant. If, subsequently, the northwest quadrant becomes the active quadrant then the electronic switches associated with the northeast quadrant become inoperative. These electronic switches may simply be transistor type switches including one or more transistor circuits for coupling signals from the switches 105 to the appropriate motors. From FIG. 11 it can be seen that, for example, when the northwest quadrant is active, the electronic switches associated therewith are operated thereby closing and coupling signals from their resistor string 92 to the motors N and W only.

The voltage on line 91 is also a determining factor with regard to the operation of the motor. Again, assuming that the northeast quadrant is active, then the speed of the motors will also depend upon the voltage between line 91 and point 93. Because point 93 is tied to a fixed voltage, the voltage on line 91 thus determines any voltage differences that are selected for operation of the appropriate motors. As the voltage increases on line 91 the motors will in turn operate quicker. Thus, as the vessel speed increases the longitude and latitude readings correspondingly change at a more rapid rate.

Although the system of this invention is intended to operate continuously, it is advisable to check the setting of the sea compass especially at the initial point of a voyage. The cylinders 81 and 82 shown in FIG. 6 may be easily adjusted through the front face of the housing, their position corresponding to an initial longitude and latitude position. For example, the initial departure point may have a longitude of 30° and a latitude of 20°. If it is assumed that the magnetic needle is at a position of 40° in the northeast quadrant, the vessel is progressing more to the north than to the east in the proportion of 40/5. Thus, from the initial point of departure at some predetermined point thereafter, on this course vessel may then be at a position of 34° longitude and 20.5° latitude.

In the northeast quadrant longitude and latitude readings are both additive. It is understood that the control operates so that in the other quadrants the motors operate so that one or both provide subtraction. For example, in the northwest quadrant, the longitude is additive but because the motor W is operated in place of the motor E, cylinder rotates in the opposite direction thus performing a subtraction function with regard to the latitude position.

Figure 13:
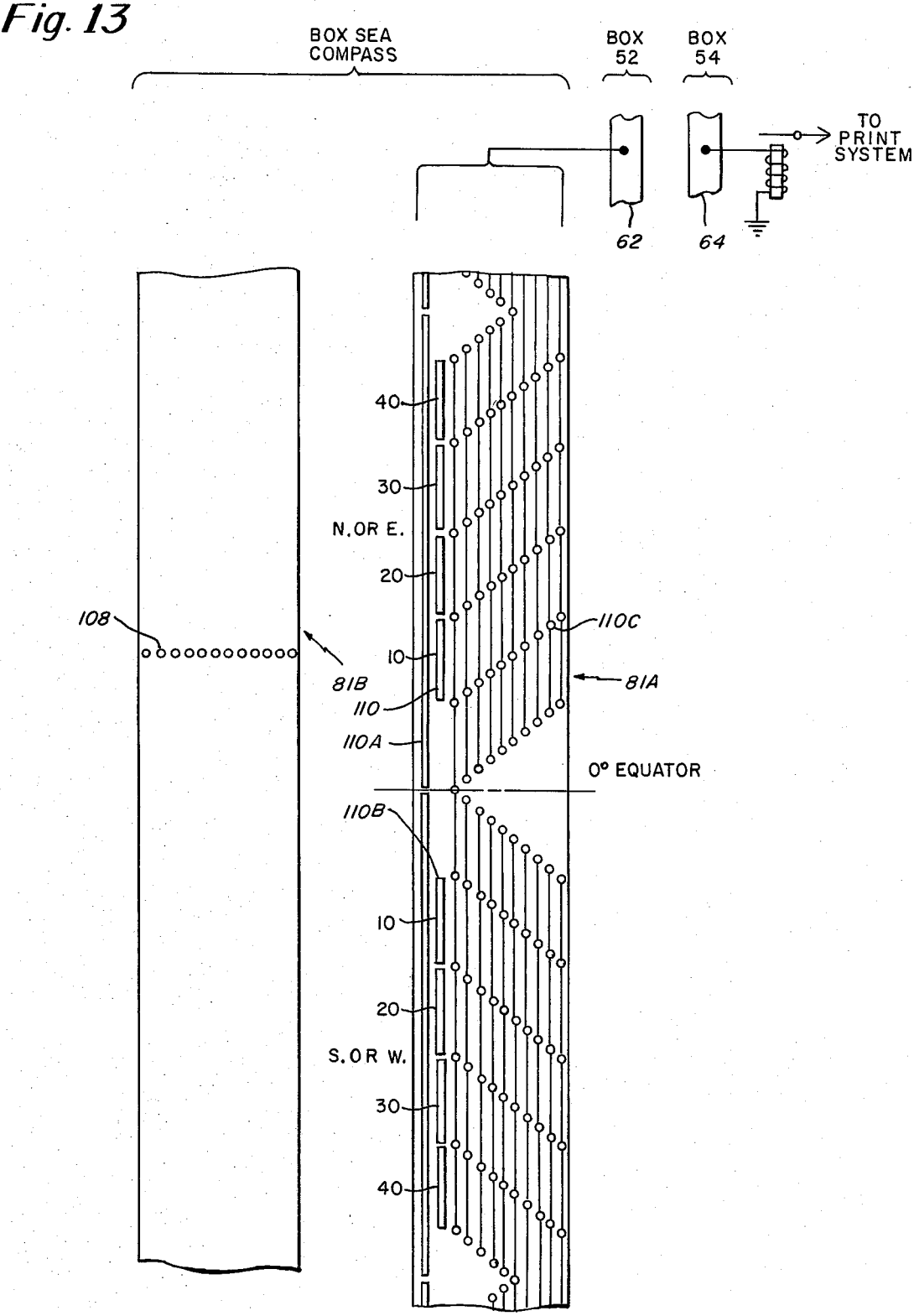
FIG. 13 shows the arrangement for detecting the longitude and latitude readings on the rotatable cylinders.

The exact latitude and longitude readings of the sea compass are interpreted by means of the mechanical arrangements shown in FIG. 13. There is included a cylinder for both latitude and one for longitude. FIG. 13 shows one of these cylinder arrangements such as the one for longitude which includes an inner cylinder 81A which is fixed in position and an outer cylinder 81B which is the rotatable one. Individual voltage signals are provided on the contacts 108 on cylinder 81B. In FIG. 13 the cylinders are shown essentially exploded from each other for the purpose of illustration. The cylinder 81A has a number of contacts 110 disposed in the array of FIG. 13. These contacts include units, tenths and quadrant contacts. The contacts 110A designate the quadrant, the contacts 110B, the tenths, and the contacts 110C, the units position. Depending upon the position of the cylinders relative to each other there will be contact alignment therebetween to provide voltage signals through the contacts for indicating the quadrant, and either the latitude or longitude.

FIG. 7 is a block diagram showing the electronics associated with the system of this invention including connections from the remote alarms 50 and the sea compass 80 by way of the registration system identified as the longitude-latitude registration system 115 discussed previously with regard to FIGS. 11 and 12.

Aboard the vessel there is provided a generator which couples to a converter 116 which in turn couples to a regulator 118 for providing DC power on line 120 to the control 115 and also to a series of relays R associated with the alarms 50. The output of the regulator 118 also couples by way of line 124 and connector parts 62 and 64 to the battery 126 which is aboard the box 54.

In FIG. 7 there are shown a series of contacts 127 and a slide member 128. When the boxes 52 and 54 are engaged, the slide member is shown in the position indicated coupling power to the relays in box 54. When the boxes disengage from each other the slide member 128 moves so that battery power is then coupled to the radio transmitter 130, means 132 for automatically reporting the position and means 134 which may be an illuminating means such as flares. The slide member 128 is normally biased by spring 129 to a position coupling power to transmitter 130. However, when the boxes 52 and 54 are engaged, the member moves to the position shown in FIG. 7. Thus, when the member 122 detects that the vessel is sinking, the box 54 is propelled from the vessel and at the same time the switching arrangement including the slide member 128 operates to immediately commence the transmission of radio signals from transmitter 130 which signals may be picked up by other vessels which will then be able to locate the box 54. At the same time, longitude and latitude signals are being stored with the printing system of the present invention so that there is a continuous log of longitude and latitude illustratively stored by the relays $R_f$ and $R_g$. Although these are shown as two relays, in actuality this information is stored by means of a series of relays for designation the quadrant, tenths and units positions, as previously discussed.

When any one of the alarms are activated, signals are coupled by way of one or more of the electronic circuits 140 to the associated relays R causing these relays to be latched and their associated contacts closed so as to couple power signals to the motor print system 142 and clock 69. Operation of the motor print system 142 enables the printing system which is discussed in more detail hereinafter. When the clock 69 is enabled, because of the latching of one of the relays R the printing system is adapted to print an indication of the exact time of the fault. Also, one of the associated relays $R_a$, $R_b$, $R_c$, $R_d$ or $R_e$ are latched to also indicate to the printing system to print an indication of the particular fault. For example, if relay $R_a$ is latched, then the printing system may print a condition of "collision".

In FIG. 7 it is noted that upon radio transmission, the means 132 is also enabled which sends a signal on line 133 to the print system 143. Thus, at the time that the box 54 is ejected from the box 52, the longitude and latitude at the time of this ejection is recorded at the printing system. Furthermore, it is this longitude and latitude that is readily observable when one finds the box 54 as viewed through the magnifying glass 75 shown in FIG. 5B. Thus, there is provided an immediate indication of longitude and latitude of the sinking when the search party retrieves the box 54 that has been ejected from the vessel.

Figure 14:
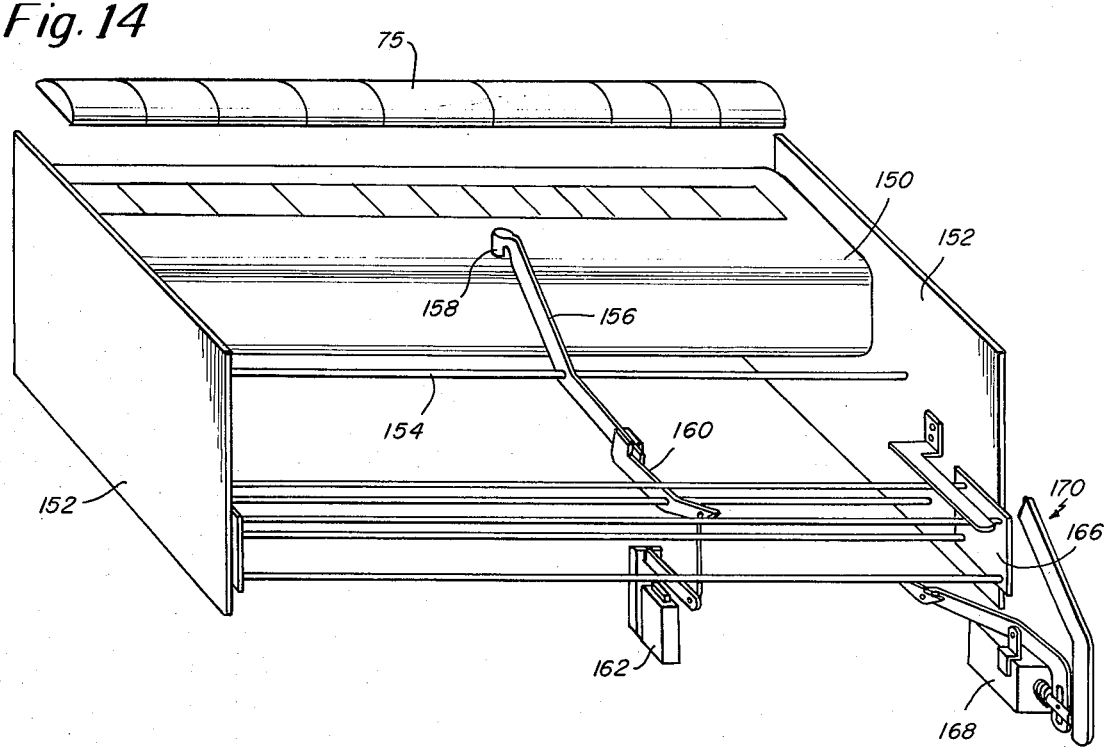
FIG. 14 is a perspective view of the printing system of this invention contained in the ejectable box.
Figure 15:
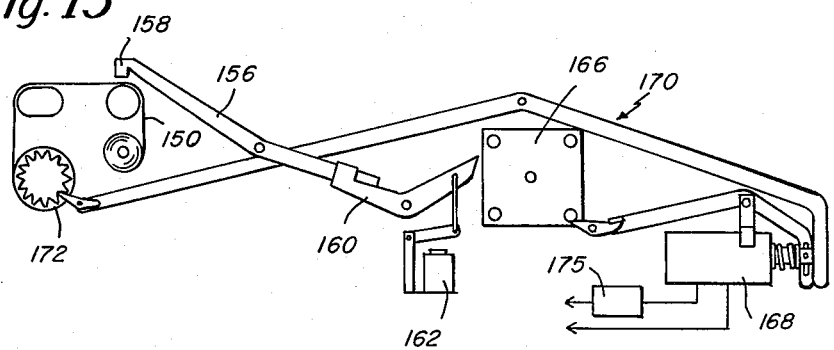
FIG. 15 is a side elevation view of the printing system of FIG. 14.

FIGS. 14 and 15 show one arrangement of a printing system which may be used for mechanically printing letters, numbers or sybols on the paper foll 150. Alternatively, the roll 150 may be constructed of a special fabric which will not be effected by time and humidity and one which will not be effected by any moisture on the roll.

The printer shown in FIG. 14 comprises side walls 152 for supporting an axis rod 154. This axis rod supports a plurality of arms 156, only one of which is shown in FIG. 14. At the end of each arm 156 there is a type font 158. The leg 156 as depicted in FIG. 15 interconnects with an actuating arm 160 operated from the electromagnet 162.

FIGS. 14 and 15 also show the hammering mechanism 166 which is moved violently under control of the electromagnet 168.

The operation of the electromagnet 168 also controls linkages 170 and paper advance wheel 172 so that for each printing sequence the paper is also, of course, advanced. The power electromagnet 168 has associated therewith a timer 175 timing each printing so that the printing can be of 5 seconds duration or more from one printing to the next.

FIG. 7 discloses a motor printing system 142 in block form. FIG. 7 also shows the electromagnet 168 corresponding to the one shown in FIG. 15. When the electromagnet 168 is operated, then the hammering mechanism is enabled and printing is permitted depending upon which of the relays 162 have been selected.

Figure 10:
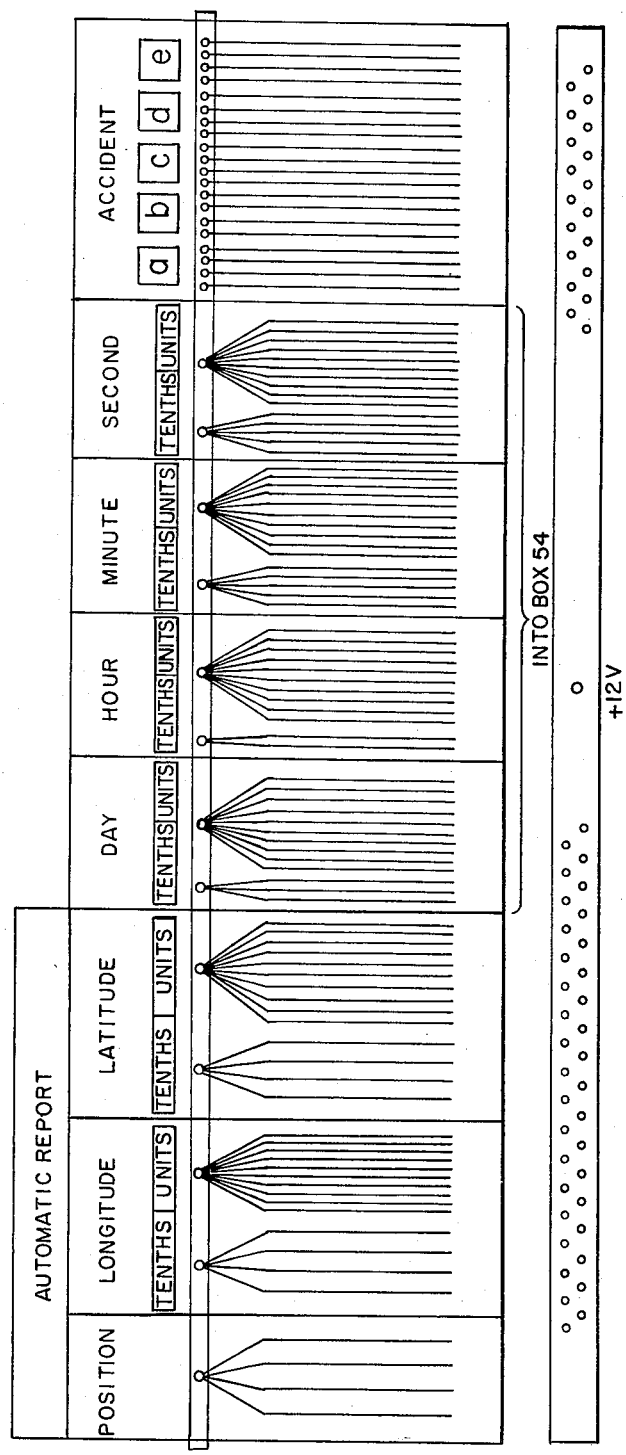
FIG. 10 is a diagram of the printing system and all of the associated information that is printed thereon.

Thus, for example, if one of the alarms a-e is actuated, the corresponding relay 162 is operated so as to permit a printing to indicate the particular fault. For example, one of the columns on the paper may be for indicating a fire condition, and under that condition a simple printing of an X may be sufficient to indicate that fault. For each accident report there may thus be one branch as indicated in FIG. 10. FIG. 10 actually shows four branches for each accident but these correspond with four different locations on the vessel. For recording time, and in particular the day, three branches are used for decimals and ten for units. For hours, two branches are used for decimals and ten for units. For minutes, five branches are used for the decimals and ten for the units. For seconds, likewise, five branches are used for the decimals and ten for the units. The recordal of the longitude and latitude and the quadrant position is also as indicated in FIG. 10 using the lines disclosed therein.

What is claimed is:

1. A vessel location system comprising;
a stationary box disposed on the vessel,
an ejectable box received by the stationary box and being seaworthy,
means associated with said boxes for retaining the ejectable box in a retained position relative to the stationary box,
means for biasing the ejectable box away from the stationary box so that when the ejectable box is released it is ejected with force from the vessel,
connector means associated with said boxes having interlocked connector parts on each box,
means aboard the vessel that is water-activated during a shipwreck condition for releasing the retaining means to enable the ejectable box to be ejected under force of the biasing means,
means aboard the ejectable box for transmitting a distress signal to permit rescuers to locate the ejectable box,
said means for transmitting including a distress signal transmitter and associated power source both aboard the ejectable box,
input electrical power means including means coupling via the connector means to the power source as long as the connector parts are intercoupled in the retained position,
and switch means responsive to releast of the ejectable box for coupling the power source to the transmitter,
said distress signal transmitter including an antenna and means for mounting the antenna from the ejectable box,
said ejectable box fitting at least partially within an open section of the stationary box, said mounting means for the antenna including an antenna pivot means permitting the antenna to be folded to a position between the two boxes when in a retained position.

2. A system as set forth in claim 1 wherein said ejectable box has printing means and circuit means for controlling the printing means.

3. A system as set forth in claim 2 including means for registering latitude and longitude signals and coupling said signals to the printing means to provide a printed record of latitude and longitude.

4. A system as set forth in claim 1 including means aboard the ejectable box for printing a latitude and longitude reading at the time of shipwreck later viewable when the ejected box is retrieved.

5. A system as set forth in claim 1 wherein said release means includes a water responsive switch coupling to an electromagnetic means in turn coupling to a release mechanism.

6. A system as set forth in claim 5 wherein said release mechanism includes a retaining hook on one of said boxes holding the boxes together and means for biasing the ejectable box away from the stationary box.

7. A system as set forth in claim 1 in combination with alarm means aboard the vessel, said alarm means coupling to said stationary box for registering therein an indication of an alarm condition.

8. A system as set forth in claim 7 including circuit means aboard the stationary box for registering an alarm condition, and printing means aboard the ejectable box for printing the alarm condition.

9. A system as set forth in claim 1 wherein said mounting means includes a rescue hoop pivotally supported from sides of the ejectable box and supporting from an end the antenna.

10. A system as set forth in claim 9 including means for biasing the antenna mounting means to an upright position on the ejectable box.

11. A system as set forth in claim 10 wherein both boxes have means defining a track permitting the ejectable box to slide within the stationary box, the connector part of the ejectable box being on an external wall thereof while the connector part of the stationary box is on an internal wall thereof.

12. A system as set forth in claim 1 wherein said switch means is disposed in the ejectable box having at least two positions including a first position corresponding to a box retaining condition for coupling via a first contact set, and a second position corresponding to an ejected condition for coupling via a second set of contacts.

13. A system as set forth in claim 12 wherein the first and second contact sets include a common contact with the switch means being in only one of the first and second positions, the other position being open.

* * * * *